(12) United States Patent
Bonnet et al.

(10) Patent No.: US 10,179,585 B2
(45) Date of Patent: Jan. 15, 2019

(54) METHOD AND DEVICE FOR MOVING A VEHICLE INTO A TARGET POSITION

(71) Applicant: DAIMLER AG, Stuttgart (DE)

(72) Inventors: Christophe Bonnet, Leinfelden-Echterdingen (DE); Andreas Hiller, Stuttgart (DE); Gerhard Kuenzel, Benningen (DE); Martin Moser, Fellbach (DE); Heiko Schiemenz, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 1 day.

(21) Appl. No.: 15/502,292

(22) PCT Filed: Jun. 26, 2015

(86) PCT No.: PCT/EP2015/001289
§ 371 (c)(1),
(2) Date: Feb. 7, 2017

(87) PCT Pub. No.: WO2016/020024
PCT Pub. Date: Feb. 11, 2016

(65) Prior Publication Data
US 2017/0225679 A1    Aug. 10, 2017

(30) Foreign Application Priority Data
Aug. 8, 2014    (DE) .................. 10 2014 011 796

(51) Int. Cl.
*B60W 30/06*    (2006.01)
*B62D 6/00*    (2006.01)
(Continued)

(52) U.S. Cl.
CPC .............. *B60W 30/06* (2013.01); *B62D 6/00* (2013.01); *B62D 15/0285* (2013.01); *G05D 1/0278* (2013.01); *B60T 2201/10* (2013.01)

(58) Field of Classification Search
None
See application file for complete search history.

(56) References Cited

U.S. PATENT DOCUMENTS 6,564,123 B2    5/2003    Hahn et al.
8,085,167 B2    12/2011    Tanaka et al.
(Continued)

FOREIGN PATENT DOCUMENTS

CN    102853827 A    1/2013
DE    102013015349 A1    4/2014
(Continued)

OTHER PUBLICATIONS

International Search Report dated Sep. 28, 2015 in related International Application No. PCT/EP2015/001289.
(Continued)

*Primary Examiner* — Todd M Melton
*Assistant Examiner* — Jason R Roberson
(74) *Attorney, Agent, or Firm* — Patent Portfolio Builders PLLC (57) ABSTRACT

A method of moving a vehicle from a start position to end position when the end position cannot be detected by the vehicle's built-in sensors involves determining the start position by a mobile terminal or by the vehicle and determining the end position by the mobile terminal. A driving trajectory of the vehicle is planned within the vehicle, a driving maneuver of the vehicle is initiated by the vehicle or the mobile terminal, and the planned driving maneuver is carried out to reach the end position.

18 Claims, 5 Drawing Sheets

(51) Int. Cl.
*B62D 15/02* (2006.01)
*G05D 1/02* (2006.01)
*B62D 1/02* (2006.01)

(56) References Cited

U.S. PATENT DOCUMENTS

| | | | |
|---|---|---|---|
| 9,062,987 B2 | 6/2015 | Sato | |
| 2010/0089677 A1* | 4/2010 | Tanaka | B62D 15/027 180/204 |
| 2010/0145601 A1* | 6/2010 | Kurtti | G01C 21/3476 701/532 |
| 2012/0072051 A1* | 3/2012 | Koon | G05D 1/0278 701/2 |
| 2012/0188100 A1* | 7/2012 | Min | G08G 1/143 340/932.2 |
| 2015/0042454 A1* | 2/2015 | Lee | G07C 9/00182 340/5.72 |

FOREIGN PATENT DOCUMENTS

| | | |
|---|---|---|
| DE | 102012022087 A1 | 5/2014 |
| DE | 102013016342 A1 | 4/2015 |
| EP | 1249379 A2 | 10/2002 |
| EP | 1249379 B1 | 10/2002 |
| EP | 2560150 A1 | 2/2013 |
| EP | 2617627 A2 | 7/2013 |
| JP | 2005041433 A | 2/2005 |
| JP | 2008009913 A | 1/2008 |
| JP | 2008114776 A | 5/2008 |
| JP | 2010140080 A | 6/2010 |
| JP | 2014065392 A | 4/2014 |

OTHER PUBLICATIONS

Written Opinion dated Sep. 28, 2015 in related International Application No. PCT/EP2015/001289.
Office Action dated Jan. 16, 2018 in related JP Application No. 2017-505146.
Office Action dated Jul. 3, 2018 in related CN Application No. 201580042522.0 (refernces from Office Action not cited herewith have previously been made of record).
Office Action dated Aug. 21, 2018 in related JP Application No. 2017-505146 (references from Office Action not cited herewith have previously been made of record).

* cited by examiner

METHOD AND DEVICE FOR MOVING A VEHICLE INTO A TARGET POSITION

BACKGROUND AND SUMMARY OF THE INVENTION

Exemplary embodiments of the present invention relate to a method for moving a vehicle into an end position, starting from a start position of the vehicle.

Current (semi-)automatic parking systems only work when they can at least partially measure the parking space to be approached using built-in sensors. The vehicle can thus determine its position using the vehicle's built-in sensors in a learned environment and will therefore be able to retrace a path that has already been travelled. However, an end position that cannot be detected by the vehicle cannot be approached.

A method and a device for moving a motor vehicle into an end position are known from European patent document EP 1 249 379 B1, in which the vehicle is brought into a start position close to the target end position, after a first activation by the driver, the surroundings of the motor vehicle are continuously scanned to detect the end position, and the current vehicle position is continuously determined, wherein control information is determined for moving the vehicle into the end position using the determined surroundings and position information. Dependent on a second activation by the driver, control commands dependent on the control information are emitted to the drive train and/or the brake system and/or the steering system of the motor vehicle, whereby the motor vehicle drives into the end position independently of the driver.

German patent document DE 10 2013 015 349 A1 discloses a method and a device for operating a vehicle, in particular for approaching a parking space in a parking zone away from the road that cannot be seen by the vehicle, in which data about the surroundings of the vehicle are detected. In the absence of built-in sensors, parking spaces to be approached repeatedly are approached without measurement and these regularly used parking spaces in the non-visible parking zones are driven into using previously recorded and stored surroundings data or driving data. This system is self-taught after repeated parking in the same area, wherein, when approaching this parking zone, relevant information is saved, such as the determined driving data or recorded surroundings data, such as the steering yaw angle, vehicle speed, GPS data and driven trajectory, and already stored driving data or surroundings data are updated so that the maneuver can be re-trained.

Exemplary embodiments of the invention are direct to a method and a device for improved availability of the autonomous parking system.

Features, possible uses and advantages of the invention are described in the following description, as well as the explanation of exemplary embodiments of the invention, which are depicted in the figures.

According to an exemplary embodiment, a method involves
  determining the start position by a mobile terminal or the vehicle,
  determining the end position by the mobile terminal,
  planning a driving trajectory of the vehicle within the vehicle,
  driving the vehicle along the driving trajectory of the vehicle being initiated by the vehicle or the mobile terminal.

This has the advantage that, due to the use of the mobile terminal, the driver can inspect the driving maneuver to be carried out by the vehicle in advance and can determine the alignment of the vehicle in the end position. A further advantage of the invention is that no additional vehicle sensors are required to plan the vehicle maneuver. It is very easy for the driver to plan the vehicle maneuver. The driving maneuver recorded by the mobile terminal can then be started by the driver by remote control. Here, the vehicle drives autonomously without support from the driver.

The start position can also be determined by the driver determining the start position using a control device on the mobile terminal. The start position can also be determined by the event "driver opens driver's door to step out" or "driver engages P on the gear selection lever". Upon activation by the driver or by an event, the vehicle or the mobile terminal then determines the current position of the vehicle and sets this position as the start position for the parking process. This has the advantage that the driver has the possibility to determine the start position without great effort. The start position can be determined in a flexible and simple manner.

The start or end position of the vehicle is advantageously determined by aligning the mobile terminal in a global coordinate system. By using this global coordinate system, the end and start position can both be easily transmitted to the vehicle and processed again there.

In one embodiment, the alignment of the mobile terminal in the global coordinate system takes place using sensor data recorded by the mobile terminal and transmitted to the vehicle. The end position of the vehicle can be easily depicted by this alignment of the mobile terminal in such a way that it can easily be used to plan a driving maneuver.

In one variation, the mobile terminal is moved from the start position into the end position, wherein the mobile terminal constantly receives data and analyses it to plan a driving maneuver. Due to this constant data, a travel path is marked which can be seen as the basis for a driving maneuver of the vehicle.

In one embodiment, the course of the vehicle is corrected by means of the mobile terminal when the driving maneuver of the vehicle is carried out. Constant monitoring of the driving maneuver of the autonomously driving vehicle is thus ensured by the driver, wherein the driver can intervene in the driving maneuver in the event of a potential collision.

One development of the invention relates to a device for moving a vehicle into an end position, comprising a control device connected to a steering unit and an engine control system and/or a braking device of the vehicle. For a device, by means of which the vehicle can approach an end position which cannot be detected by sensors:
  a mobile terminal is connected to the control device by a wireless communication device, which is used to determine a start position or an end position of the vehicle, and
  the control device determines a target path on the basis of the driving maneuver plan produced by the mobile terminal and completes the target path by activating the steering unit and the engine control system or the braking device.

Based on a driving maneuver proposed by the mobile terminal, the device can calculate a real path the vehicle should take for parking in or taking up the non-visible end position, even without the vehicle's own sensor data having to be evaluated.

The control device advantageously comprises a path control device connected to a position determination device of the control device, the position determination device determining a start position of the vehicle. The accuracy of the target path emitted by the control device is improved by independent determination of the start position of the vehicle independently of the mobile terminal.

A further embodiment of the invention relates to a device for planning driving maneuvers of a vehicle, comprising a computer unit. In the event of such a device that is suitable for controlling an end position that cannot be detected by the vehicle's built-in sensors:

the computer unit is connected to at least one position detection sensor for determining a start position or an end position or a potential travel path of the vehicle, the at least one position detection sensor is managed on a position calculation unit of the computer unit that determines the position of the device in a global coordinate system, the position calculation unit and a position determination unit are connected to a driving maneuver planning unit that plans the driving maneuver, and the computer unit is connected to a transmitter/receiver unit that sends the start position or the end position or the planned driving maneuver to the vehicle.

A possible travel path of the vehicle can be determined independently of the vehicle using such a mobile device. It can then be transferred wirelessly to a control device of the vehicle that can adjust the proposed driving maneuver by means of its own position data and determines and follows a target travel path of the vehicle using this.

The position calculation unit for calculating a yaw angle is advantageously connected to a gyroscope or a magnetic field sensor or an acceleration sensor, the position calculation unit emitting sensor data comprising all three spatial directions. By means of such position sensors contained in the mobile device, a very precise three-dimensional positioning of the mobile device can be provided in both a start position of the vehicle and in a possible end position of the vehicle. In particular, the end position can be clearly determined three-dimensionally through the alignment of the mobile device in the global coordinate system.

In one variant, the position determination unit is connected to a wireless positioning system. Such a wireless positioning system is to be understood as a mobile radio network or a WLAN network or satellite-based systems such as, for example, GPS. These are particularly advantageous when additional sensors in the mobile device are to be dispensed with. Alternatively, the data of the positioning systems can also be used to calibrate the data determined by the sensors of the mobile device.

Further advantages, features and details arise from the following description in which at least one exemplary embodiment is described in detail, if applicable with reference to the drawing. Described or visually depicted features can form the subject matter of the invention individually or in any meaningful combination, if appropriate also independently of the claims, and in particular can also be the subject of one or more separate application(s). The same reference numerals refer to the same, similar or functionally identical parts.

BRIEF DESCRIPTION OF THE DRAWING FIGURES

Here are shown.

DETAILED DESCRIPTION

Figure 1:
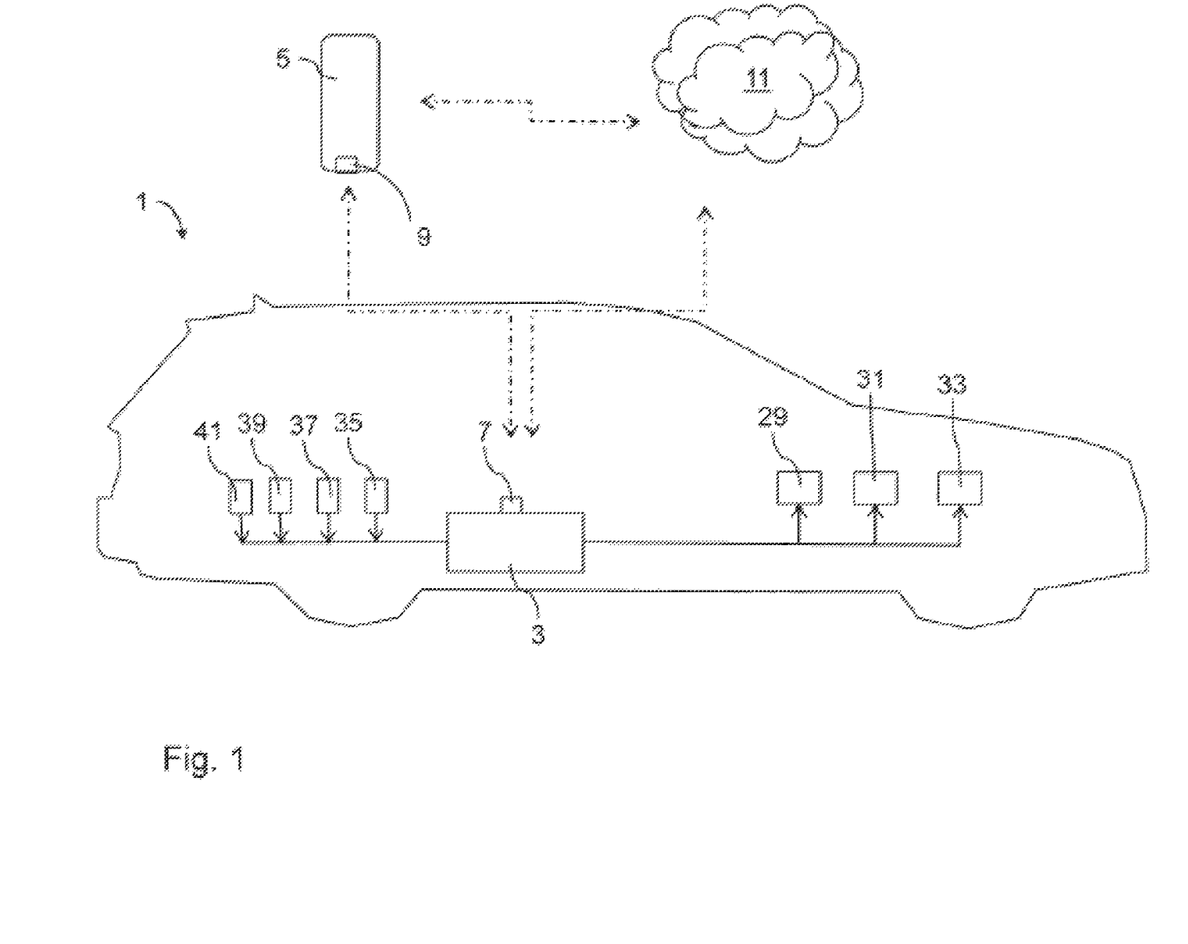
FIG. 1 an exemplary embodiment for a vehicle having a driver assistance system according to the invention, FIG. 2 an exemplary embodiment for a mobile terminal according to the invention, FIG. 3 an exemplary embodiment for a device according to the invention for autonomously moving a vehicle into an end position, FIG. 4 an exemplary embodiment for planning a driving maneuver of a motor vehicle with a trailer, FIG. 5 an example of planning a driving maneuver of a vehicle without a trailer.

FIG. 1 shows a vehicle 1 having a driver assistance system, by means of which the vehicle 1 can be moved from a start position S into an end position E that cannot be seen by the vehicle 1. The driver assistance system comprises a mobile terminal 5 and a control device 3 of the vehicle 1. The control device 3 communicates wirelessly with the mobile terminal 5 and a satellite positioning system 11 via a transmitter/receiver unit 7. In addition, the control device 5 receives signals from the vehicle's built-in sensors, such as a rotational speed sensor 35, a gyroscope 37, a magnetic field sensor 39 and at least one environment sensor 41, for example an ultrasonic sensor, a radar sensor, a laser scanner or a camera. At the same time, the control device 3 gives control commands to a steering device or a braking device 31 or an engine control system 33 of the vehicle 1. The mobile terminal 5 also communicates wirelessly with the satellite positioning service 11 via its transmitter/receiver unit 9.

Figure 2:
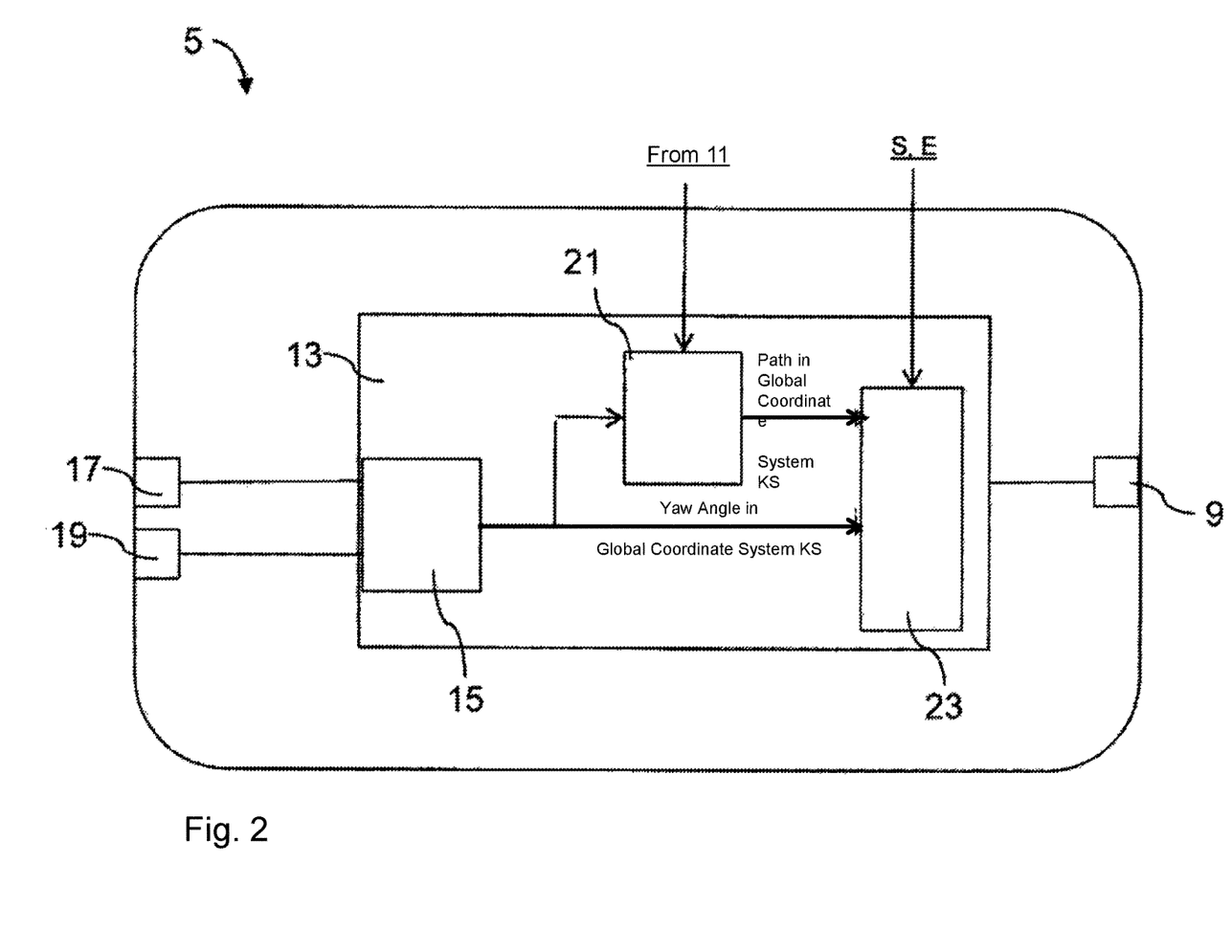

FIG. 2 illustrates an exemplary embodiment of a mobile terminal 5 according to the invention in the form of a smartphone and comprising a computer unit 13. The computer unit 13 has a position calculation unit 15, to which a gyroscope 17 and a magnetic field sensor 19 of the mobile terminal 5 are connected, in order to determine the alignment of the mobile terminal 5 in the global coordinate system KS. In addition to the gyroscope 17, which operates in all three spatial directions, and the magnetic field sensor 19, which also takes into account all three spatial directions, and has orientation comparable to a compass in the geomagnetic field, acceleration sensors can also be arranged in the mobile terminal 5 that also measure the accelerations of the mobile terminal 5 in all three spatial directions.

The yaw angle calculated in the position calculation unit 15 is supplied to a position determination unit 21 that also compares this position with GPS position data or signals from positioning services 11 such as mobile radio or WLAN. However, the position determination in the mobile radio network or with respect to existing WLAN networks can also take place using the yaw angle as an alternative to the position calculation. A satellite-based position determination with GPS is also common.

Both the yaw angle determined by the position calculation unit 15 and a path determined by the position determination unit 21 are emitted in the global coordinate system KS to a maneuver planning device 23. A start position S and an end position E marked by the driver are furthermore supplied to this driving maneuver planning device 23, from which the mobile terminal 5 determines a plan for the driving maneuver of the vehicle 1 from the start position S to the end position E that is emitted to the control device 3 of the vehicle 1 via the transmitter/receiver unit 9.

The planned driving maneuver is therefore only emitted from the mobile terminal 5 to the control device 3 when the mobile terminal 5 has observed that the planned path for the driving maneuver is also viable.

Figure 3:
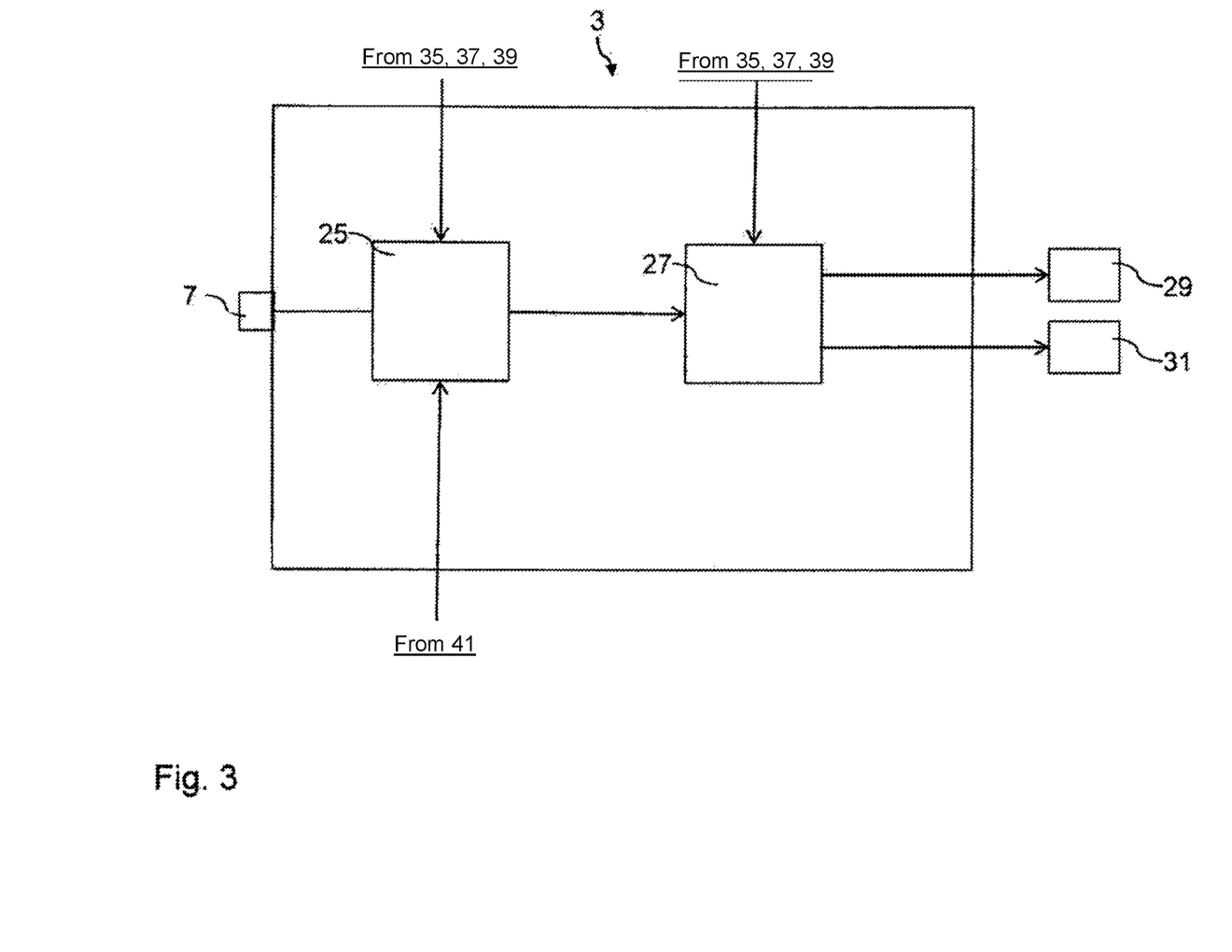

As shown in FIG. 3, the transmitter/receiver unit 7 of the control device 3 receives the planned driving maneuver from the mobile terminal 5. The control device 3 comprises a path planning unit 25, in which parameters emitted by the vehicle's built-in sensors 35, 37, 39 are processed, such as wheel rotation speeds, the yaw rate and a magnetic field. Data can optionally also be recorded by the environmental sensors 41 of the vehicle 1, such as an ultrasonic sensor, radar sensor, laser scanner or camera, and is then transmitted to the path planning unit 25 of the control device 3. A target path is calculated in the path planning unit 25 for the vehicle 1 that is to be moved from the start position S to the end position E. This target path of the vehicle 1 is emitted to a path control unit 27 that also receives parameters from the vehicle's built-in sensors 31, 33, 35 such as wheel rotation speeds, yaw angles and bend angles. Depending on these parameters and the target path, the path control unit 27 gives control signals to the steering unit 29 of the vehicle 1 in the form of a target steering wheel angle and to an engine control system 33 and/or braking system 31 in the form of a target driving speed.

Figure 4:
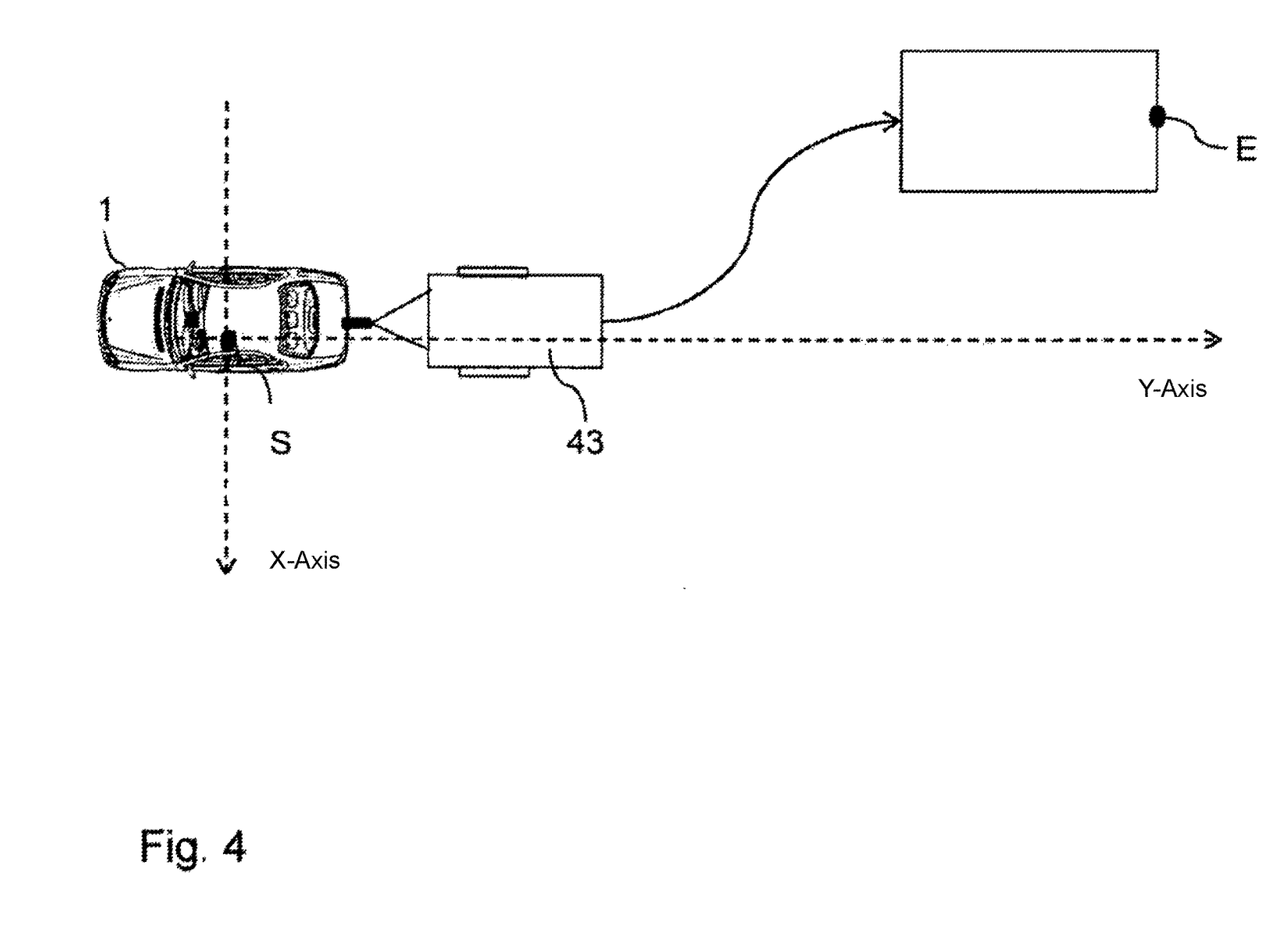

As shown in FIG. 4, the start position S of the vehicle 1 is located at the origin of the global coordinate system KS. The driving maneuver is planned and carried out in this coordinate system KS. The position of the mobile terminal 3 within the global coordinate system is determined by the sensors of the mobile terminal 5. The position of the vehicle 15 in the global coordinate system KS is determined by the vehicle sensors.

FIG. 4 depicts the motor vehicle 1 with a trailer 43 that is to be moved into a parking space, wherein the end position E, i.e., the parking space, cannot be detected by the vehicle's built-in sensors. The vehicle 1 is therefore unable to determine the end position E of the trailer 43. It is easy to transfer the trailer 43 into the desired end position E by means of the mobile terminal 5, for example a smart phone. First of all, the driver occupies the driver's seat in the motor vehicle 1 and marks the current position of the mobile terminal 5 as the start position S for the vehicle maneuver. Alternatively, the start position can also be detected by the control device 3 of the vehicle 1.

When the driver detects the start position of the driving maneuver from the driver's seat in the vehicle 1, the following sensor data must be recorded:
  alignment of the vehicle 1 in the geomagnetic field,
  alignment of the mobile terminal 5 in the geomagnetic field, and
  position data from the GPS or other location services 11 can also be used.

The driver then gets out and walks to the desired end position E of the trailer 43. Here too, the driver marks the parking space as the end position E for the driving maneuver on the mobile terminal 5. In addition, the alignment of the trailer 43 in the end position E is determined by the alignment of the mobile terminal 1 in the end position E.

A driving maneuver of the vehicle 1 is planned in the maneuver planning unit 23 of the mobile terminal 5 from the path recorded by the position determining unit 21 of the mobile terminal 5 from the start position S to the end position E for suitable moving the trailer 43, the driving maneuver being transmitted to the control device 3. In the control device 3, a target path of the vehicle 1 is determined in the path planning unit 25, by means of which the trailer 43 is to be moved from the start position S into the end position E. After determining the target path, the driver starts the driving maneuver using the mobile terminal 5, wherein the path control unit 27 controls the autonomous journey of the vehicle 1 and corrects the target path based on the parameters from the vehicle's built-in sensors 35, 37, 39, 41 and emits control commands to the steering unit 29 or the engine control system 33 or the braking device 31. The movement of the trailer 43 with respect to the vehicle 1 is detected using a bend angle sensor (not depicted in more detail), which is preferably integrated in the spherical head of the tow bar and emitting signals to the control device 3. Here, the driver must continuously carry out the circular motion on a touch screen of the mobile terminal 5 in order to move the vehicle 1 from the start position S to the end position E. When the trailer 43 has arrived in its end position E, this is indicated to the driver on the mobile terminal 5.

The different lanes, which are preset by the mobile terminal 5 but also corrected by the control device 3, can be displayed not only on the mobile terminal 3 but also on a display in the vehicle 1. The driver can then select his preferred maneuvering path.

Figure 5:
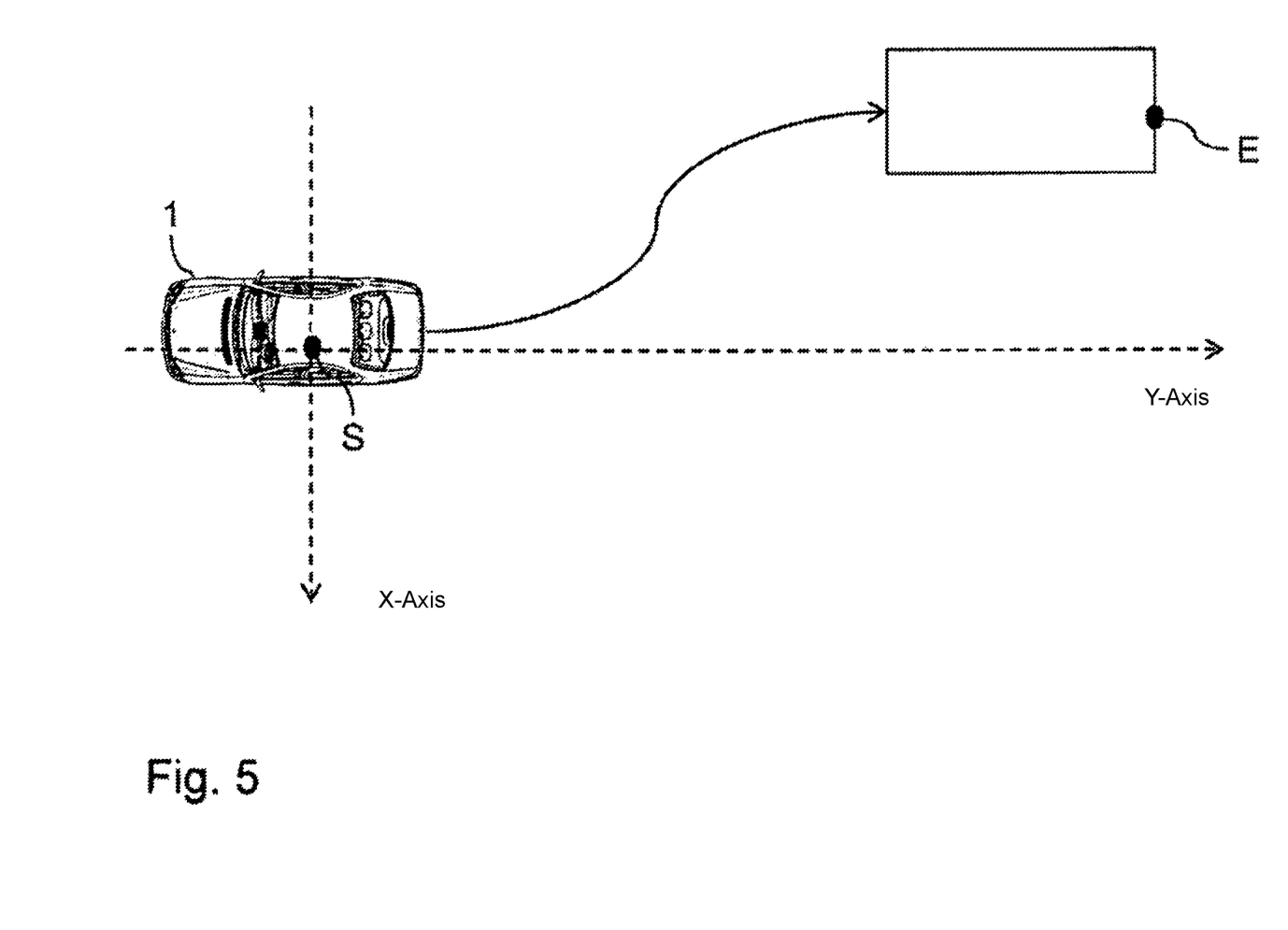

This driving maneuver planning with the aid of the mobile terminal 5 is not limited to the control of a combination of a vehicle 5 and trailer 43, but can also be used as an enhancement for automated parking functions without a trailer. FIG. 5 shows the described driving maneuvers with a vehicle 1 without a trailer. Here too, the start point S for the driving maneuver is located in the vehicle 1, which also forms the origin of the global coordinate system KS. After the driver has recorded the start position in the vehicle 1, the driver travels with the mobile terminal 5 to the end position E of the driving maneuver and records this on the spot. The following signals are calculated in the mobile terminal 5 from the start position S to the end position E:

By integrating the three yaw rates from the gyroscope 17 of the mobile terminal 5, three yaw angles are generated in the global coordinate system KS. These yaw angles outline the rotation of the mobile terminal 5 in the global coordinate system KS. In addition, the magnetic field sensor 19 can be used to support the yaw angle calculation. The yaw angles are used to convert the three components of the acceleration sensor into the global coordinate system KS. The path travelled by the driver can be recorded in the global coordinate system KS by a twofold integration of the three acceleration components. In addition, GPS position data or position data from other positioning services 11 are used to support the path calculation in the position determination unit 21.

Once the driver has reached the desired end position E, the driver confirms this on the mobile terminal 5, which marks this. The driver then has the option on the mobile terminal 5 of setting the alignment of the vehicle 2 in the end position E by rotating a schematic depiction of the vehicle 1. If the driver agrees with this, the driving maneuver can be started by activating the mobile terminal 5. When driving according to the planned driving maneuver of the vehicle 1, the driver can specify small course corrections via the mobile terminal 1 during the driving maneuver, i.e., the driver can move the vehicle 1 by a small offset around the planned path.

As described, various driving maneuvers can be planned with the mobile terminal 5 and displayed to the user for selection, for example pulling into and out of a parking space with a normal vehicle or pulling into and out of a parking space with a trailer.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for moving a vehicle from a start position into an end position along a target path which is determined in the vehicle, the method comprising:
   determining, by the mobile terminal or the vehicle, the start position;
   determining, by the mobile terminal, the end position, wherein the end position is a position of the mobile terminal;
   determining alignment of the vehicle in the end position using an alignment of the mobile terminal in a global coordinate system;
   determining the target path based on the determined start position, the determined alignment, and the determined end position that is a location of the mobile terminal;
   initiating, by the vehicle or by a mobile terminal, driving the vehicle along the target path; and
   autonomously driving the vehicle along the target path into the end position.

2. The method of claim 1, wherein the determination of the start or end position of the vehicle is activated by an event and the start or end position is determined by the alignment of the mobile terminal in a global coordinate system.

3. The method of claim 1, wherein the alignment of the mobile terminal in the global coordinate system is determined using sensor data recorded by the mobile terminal and transmitted to the motor vehicle.

4. The method of claim 3, wherein the mobile terminal is moved from the start position into the end position, wherein the mobile terminal constantly receives data and analyses the received data to plan a driving maneuver.

5. The method of claim 4, further comprising:
   correcting, by the mobile terminal, a course of the vehicle when the driving maneuver of the vehicle is carried out, wherein the correction is an offset around the target path.

6. A device for moving a vehicle from a start position into an end position, the device comprising:
   a controller arranged in the vehicle and coupled to a steering unit and an engine control system or a braking device of the vehicle,
   wherein a mobile terminal is wirelessly connected to the controller,
   wherein the mobile terminal determines the end position of the vehicle, wherein the end position of the vehicle is a position of the mobile terminal,
   wherein the controller determines a target path on the basis of a driving maneuver plan produced by the mobile terminal, which is determined at least based on the determined end position that is a position of the mobile terminal, and sets off on the target path by activating the steering unit and the engine control system or the braking device, and
   wherein alignment of the vehicle in the end position is determined by an alignment of the mobile terminal in a global coordinate system.

7. The device of claim 6, wherein the controller comprises a path control unit connected to a position determination device of the controller, wherein the path control unit determines the start position of the vehicle.

8. A device for planning driving maneuvers of a vehicle, the device comprising:
   a computer;
   at least one position detection sensor connected to the computer, wherein the at least one position detection sensor determines an end position, wherein the end position is a position of the device; and
   a transmitter/receiver unit connected to the computer, wherein the transmitter/receiver unit sends a start position, the end position or a planned driving maneuver to the vehicle,
   wherein the computer comprises a position calculation unit, to which the at least one position detection sensor is connected and which determines the position and alignment of the device in a global coordinate system, and
   wherein the computer comprises a driving maneuver planning unit connected to the position calculation unit and the position determination unit and which plans the driving maneuver based at least on the end position that is a position of the device.

9. The device of claim 8, wherein the position calculation unit calculates a yaw angle and is connected to a gyroscope, a magnetic field sensor, or an acceleration sensor, wherein the position calculation unit emits sensor data comprising all three spatial directions.

10. The device of claim 8, wherein the position determination unit is connected to a wireless positioning system.

11. The method of claim 1, wherein sensors of the vehicle cannot detect the end position prior to initiating driving of the vehicle along the target path.

12. The method of claim 1, wherein the determination of the end position comprises:
   determining a current position of the mobile terminal responsive to an input on the mobile terminal.

13. The method of claim 12, wherein the determination of the start position comprises:
   determining a current position of the mobile terminal responsive to an input on the mobile terminal.

14. The method of claim 1, wherein the autonomous driving of the vehicle along the target path into the end position is performed so long as an input is detected on a touch screen of the mobile terminal.

15. The device of claim 6, wherein sensors of the vehicle cannot detect the end position prior to initiating driving of the vehicle along the target path.

16. The device of claim 8, wherein sensors of the vehicle cannot detect the end position prior to initiating driving of the vehicle along the target path.

17. The device of claim 8, wherein the at least one position detection sensor determines the end position by determining a current position of the device responsive to an input on the device.

18. The device of claim 17, wherein the at least one position detection sensor determines the start position by determining a current position of the device responsive to an input on the device.

* * * * *